United States Patent [19]

Nakajima

[11] Patent Number: 4,500,027
[45] Date of Patent: Feb. 19, 1985

[54] METHOD OF MANUFACTURING SOLDERING TIPS

[75] Inventor: Masahiko Nakajima, Tokyo, Japan

[73] Assignee: Nakajima Dokosho Company Limited, Tokyo, Japan

[21] Appl. No.: 438,706

[22] Filed: Nov. 2, 1982

[30] Foreign Application Priority Data

Nov. 9, 1981 [JP] Japan .................... 56-179263

[51] Int. Cl.³ .............................. B26K 3/02
[52] U.S. Cl. ............................ 228/54; 72/47
[58] Field of Search ............ 228/54, 55; 72/47

[56] References Cited

U.S. PATENT DOCUMENTS

| 2,358,892 | 9/1944 | Upton | 72/47 |
| 3,125,055 | 3/1964 | Lerner | 228/54 |
| 3,662,152 | 5/1972 | Weller et al. | 228/54 X |
| 4,055,744 | 10/1977 | Fortune | 228/54 X |

FOREIGN PATENT DOCUMENTS

| 70656 | 9/1973 | Japan . | |
| 59738 | 6/1974 | Japan . | |
| 62966 | 5/1979 | Japan | 72/47 |

Primary Examiner—Kenneth J. Ramsey
Attorney, Agent, or Firm—Cushman, Darby & Cushman

[57] ABSTRACT

A copper soldering tip with uniform and intact iron protection is manufactured by plating an iron layer of adequate hardness on the surface of a copper substrate to form a tip blank and then shaping the thus formed blank under pressure into a desired final tip configuration. The soldering tip has a uniform erosion resistance and can be produced with ease at a good yield.

8 Claims, 5 Drawing Figures

METHOD OF MANUFACTURING SOLDERING TIPS

BACKGROUND OF THE INVENTION

1. Field of the Invention

This invention concerns a method of manufacturing soldering tips for use with electric soldering instruments, including automatic soldering or desoldering machines, as well as to such soldering tips.

2. Description of the Prior Art

Soldering tips for use with electric soldering instruments are generally made of copper metal which has good heat conductivity and excellent workability.

However, soldering tips made of copper tend to be eroded or consumed in frequent use by the attack of solder and/or flux under the high working temperature and this disadvantage has become remarkable in recent years as the soldering work has been employed in continuous line operation, in which articles supplied one by one, for example, on a belt conveyor at a considerable line speed have to be soldered successively. Particularly, in a case where the soldering work is applied to the accurate fabrication, for instance, of fine electronic components, the top ends of soldering tips, which may possibly be less than 1 mm in diameter, are readily consumed to necessitate frequent replace of the tips thereby worsen the working efficiency.

In view of the foregoings, the surfaces of the copper tips have often been plated with iron to about 50–500 $\mu$m thickness in order to protect the tips against such undesired consumption.

In a conventional method of manufacturing an erosion resistant soldering tip of this type, a copper substrate is at first shaped into a desired tip configuration and then an iron layer is plated to a required thickness on the outer surface of the thus shaped copper blank.

In the iron plating process, however, since the current density in a plating bath is not uniform but centralized locally, for instance, at the top end and the edge portions of the copper substrate, the thickness of the resulted plated layer is increased unevenly in these portions, where the texture of the deposited iron is undesirably hard and brittle as well. In view of the above, the surface of the iron layer plated on the copper substrate is usually finished by cutting or grinding work, for instance, using lathe, milling machine, grinder or endless sand paper.

However, since the unevenness for the thickness of the electrically deposited layer can not exactly be recognized merely by its appearance, it is difficult to finish the plated layer into a uniform thickness with no scattering over the entire surface, which often results in defective final products having not uniform thickness and thus erosion resistance.

The above problem is particularly remarkable upon manufacturing a soldering tip having a top end of a fine diameter, in view of the plating process and the prefabrication work. In manufacturing a soldering tip whose top end has, for example, about 1 mm total diameter including the thickness of the plated iron layer of about 250 $\mu$m, the actual diameter for the top end of the copper substrate should be 0.5 mm or less. However, such fine end of the substrate would easily be flexed or injured by being caught in the holes of a barrel wall to extremey reduce the product yield during plating process in a rotary barrel. This is also caused more or less in other plating units such as those using rack members.

In addition, it is very difficult to fabricate the end of the copper substrate into various shapes with less than 0.5 mm in diameter by machining work, which brings about a problem in the mass production of such tips. For decreasing the uneven deposition of the iron layer it has thus been attempted to carry out the plating process for a longer time while using moderate plating conditions, but it is time-consuming and can not yet dissolve the foregoing problems completely.

For alleviating the difficulties involved in the manufacture and finishing of the iron-plated copper soldering tips, W. S. Fortune suggests in his U.S. Pat. No. 4,055,744, to assemble a soldering tip by the use of a copper core and an iron or steel cap by fitting the former into the latter and then shaping them together into a desired configuration by hammering, peening or the like as shown in FIG. 10 through FIG. 19 of the patent. However, in the Fortune's tip, since the copper core and the iron cap have to be fabricated separately by machining or the like in complementary shapes and then just fitted to each other, it may complicate the manufacturing step for the tip, particularly, of fine diameter as compared with the plating method. Thus, no effective means have hitherto been known for the improvement of iron-plated copper soldering tips.

SUMMARY OF THE INVENTION

Accordingly, it is an object of this invention to provide a soldering tip comprising a copper substrate and an iron layer plated thereon with an excellent and uniform erosion resistance.

Another object of this invention is to provide a method of manufacturing the soldering tip as mentioned above without requiring skilled technics and at a good yield.

The present inventors has made earnest studies and experiments on iron-plated soldering tips and, as the result, found that the above objects can be attained by manufacturing a soldering tip through a step of plating the outer surface of a copper substrate with an iron layer to form a tip blank and a subsequent step of shaping the tip blank under pressure into a desired final tip configuration.

The soldering tip manufactured by the above method comprises a copper substrate and an iron layer plated on the outer surface of the copper substrate, in which the copper substrate and the iron layer are integrally shaped under pressure into a desired final tip configuration.

It is surprising that a copper soldering tip with a uniform erosion resistance can be manufactured with ease by merely plating the surface of a copper substrate with an iron layer and then shaping them, for example, by forging into a desired final tip configuration.

According to this invention, since the final configuration of a tip is given in the subsequent shaping step, the starting copper substrate may be of any optional size and configuration, which can facilitate the pre-fabrication work for the starting copper substrate, as well as improve the handleability thereof in the plating process.

Further, since the outer iron layer plated on the surface of the copper substrate is pressed uniformly, for example, by forging in the shaping step of this invention, the soldering tip of this invention has excellent and uniform erosion resistance.

Furthermore, since the protrusions of the deposited iron layer, if formed on the copper substrate, can be levelled in the subsequent shaping step in this invention, no particular considerations are necessary for the plating process such as increase in the plating time instead of using moderate plating conditions as in the prior art method. This enables to shorten the production period and improve the productivity.

For the subsequent shaping step under pressure essential to this invention, it is preferred to condition the hardness of the iron layer plated on the copper substrate to less than 260 Hv and, more preferably, less than 200 Hv (Vickers hardness) in order to improve the malleability or forgeability of the plated iron layer. If the hardness of the iron layer excess 260 Hv, cracks may some time be developed in the iron layer during the subsequent shaping step. The hardness of the plated iron layer can be adjusted by properly controlling the plating conditions, such as voltage current density, plating time, bath composition, plating temperature or the like.

The shaping step under pressure applied to the tip blank comprising the copper substrate and the iron outer layer plated thereon can be executed by any known means such as forging, pressing or like other technics. Forging process is actually preferred for the method of this invention and it can be applied by using a rotary swaging machine, a forging press or the like.

It is also preferred in this invention to subject the iron-plated copper blank to adequate heat-treatment, i.e., annealing prior to the shaping step in order to reconstitute the texture of the iron layer so as to be more malleable or forgeable. Although heat-treatment even at a relatively low temperature between about 400°–450° C. is already effective for this purpose, annealing near the transformation temperature of iron (at about 740° C.) is most preferred.

BRIEF DESCRIPTION OF THE DRAWINGS

These and other objects, as well as the features of this invention will become clearer by the following explanations for a preferred embodiment of this invention in conjunction with the accompanying drawings, wherein.

DESCRIPTION OF THE PREFERRED EMBODIMENT

Figure 1:
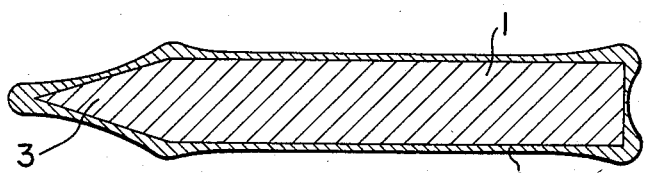
FIG. 1 shows an enlarged cross section of a copper blank for a conventional soldering tip after deposited with an iron layer.

A preferred embodiment of a soldering tip and a method of manufacturing the same according to this invention will now be described more specifically in comparison with the prior art. Referring at first to a soldering tip manufactured by the conventional method, a copper substrate 1 is plated on the outer surface thereof with an iron layer 2 as shown in FIG. 1. As apparent from the drawing, the thickness of the plated iron layer 2 is unevenly increased at edged portions, particularly, at the top end 3 of the copper substrate 1 due to the locally increased current density during plating process and skilled finishing is required subsequently for levelling these protruded portions of the deposited iron into a uniform thickness. In addition, since the top end 3 of the copper substrate 1 has to be shaped initially into a desired final configuration, it will result in the difficulty in the prefabrication and in the plating process for a fine tip as having the tip end 3 with 1 mm $\phi$, although it is shown by a considerably enlarged scale in the drawing.

FIG. 2 through FIG. 5 depict the steps for manufacturing a soldering tip according to a preferred embodiment of this invention.

A copper rod 5.7 mm in diameter was cut to a 60 mm length as a copper substrate and one of its end is formed into a semi-spherical top end. Then, the copper substrate was cleaned with trichlene and further with water and immersed in an aqueous solution of hydrochloric acid.

Thereafter, a plurality of such pre-treated copper substrates were plated with iron at their outer surfaces in a rotary type barrel plating unit.

In the iron plating process, bath composition and other plating conditions were adjusted as below so that an iron layer with about 200 Hv or less of Vickers hardness can be deposited at about 150 $\mu$m thickness on the surface of each copper substrate:

Bath Composition

Ferrous chloride 400–450 g/l
Potassium chloride 250–280 g/l
in an aqueous solution of hydrochloric acid diluted to a concentration giving acidic pH of 1.0–1.5.

Plating Conditions

Figure 2:
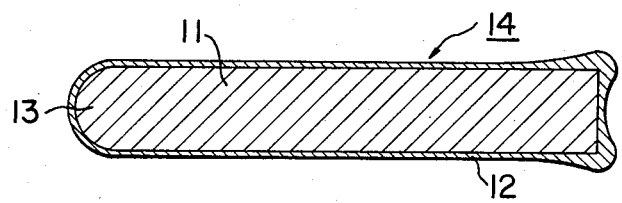
FIG. 2 shows an enlarged cross section of a copper blank to be shaped into a soldering tip by the method according to this invention.

Current density 0.6–1.2 A/dm$^2$
Bath temperature 95°–100° C.
Plating time 24–48 hours After the plating step, a copper blank 14 having a copper substrate 11 and an outer iron layer 12 deposited on the surface of the substrate 11 was obtained as shown in FIG. 2.

The iron outer layer 12 with about 200 Hv of Vickers hardness was plated on the surface of the copper substrate 11. Since the copper substrate 11 had a considerably large diameter of 5.7 mm $\phi$, it was neither flexed nor injured in the barrel plating process, as well as cutting and semi-spherical fabrication for the copper rod resulted in no substantial difficulty. Furthermore, since the top end 13 of the copper substrate 11 was not sharpened as in the conventional substrate 1 shown in FIG. 1 but rounded smoothly into the semi-spherical portion, the iron layer 12 was uniformly deposited on this portion.

Figure 3:
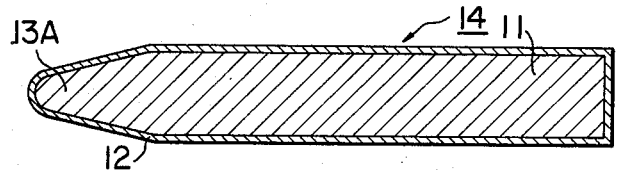
FIG. 3 and FIG. 4 respectively show enlarged cross sections of the copper blank shown in FIG. 2 in the course of the successive forging steps.
Figure 4:
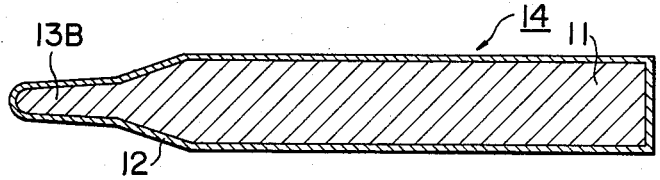

Then, the copper blank 14 thus formed was forged successively using rotary swaging machines (Model QE1650 and H3050, manufactured by Sward Co., Ltd.) to reduce the diameter at the top end from 13A to 13B as shown in FIG. 3 and FIG. 4.

Figure 5:
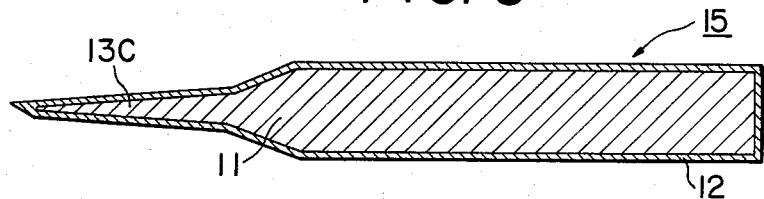
FIG. 5 shows an enlarged cross section of a finally shaped soldering tip of this invention.

At last, the copper blank 14 was forged into a desired final tip 15 of a stepped configuration as shown in FIG. 5 in which a top end 11C had a considerably reduced diameter and the leading end was orthogonally cut away.

In the course of the successive forging steps, the copper blank could be shaped into the desired configuration automatically conforming the die shape of the swaging machine. Further, because of the adequate malleability given by the hardness control at the plating process, the iron layer 12 was satisfactorily forged integrally with the copper substrate 11 into a dense and uniform thickness and, even when the diameter of the top end 13C was much reduced, neither the uniformity was lost nor the cracks were developed in the iron layer 12.

Thus, a soldering tip having a fine top end uniformly coated with an iron layer could be obtained by starting from a copper substrate having a considerably larger diameter and requiring no fine pre-fabrication, by applying iron in the plating step with no substantial difficulty and by forging the thus plated copper blank into finer top end while keeping intact and uniform thickness of the plated iron layer.

Although a satisfactory soldering tip can be obtained by applying the forging step to the copper blank just after it is plated with the iron layer, that is, by cold-forging as described in the above embodiment, the forgeability of the plated iron layer could further be improved by applying adequate heat-treatment to reconstitute the texture of the deposited iron so as to be more forgeable i.e., by applying annealing to the copper blank before the forging step. In another embodiment of this invention, the copper blank shown in FIG. 2 was heated to about 450° C. prior to the forging step. In this case, the copper blank of 5.7 mm $\phi$ could be forged into a final tip having a fine top end as small as of 1 mm $\phi$ with no cracks developed therein. This annealing effect could further be improved by raising the annealing temperature near the transformation point of iron (about 740° C.).

As stated above specifically, according to this invention, a soldering tip comprising a copper substrate and an iron layer with a uniform erosion resistance can be mass-produced with ease and at a good yield. Such a soldering tip is suitable for use with electric soldering instruments, including automatic soldering or desoldering machines.

What is claimed is:

1. A method of manufacturing a soldering tip, which comprises:
   plating the outer surface of a copper substrate having a rounded top end with an iron layer to form a tip blank, and
   subsequently, shaping said tip blank under pressure into a desired final tip configuration.

2. The method of manufacturing a soldering tip as defined in claim 1, wherein the iron layer plated on the copper substrate has a Vickers hardness of less than 260 Hv.

3. The method of manufacturing a soldering tip as defined in claim 2, wherein the iron layer plated on the copper substrate has a Vickers hardness of less than 200 Hv.

4. The method of manufacturing a soldering tip as defined in claim 1, 2 or 3, wherein the tip blank is cold-forged into a desired final tip configuration.

5. The method of manufacturing a soldering tip as defined in claim 1, 2 or 3, wherein the copper blank is subjected to annealing before said blank is shaped under pressure into a desired final configuration.

6. A soldering tip comprising a copper substrate and an iron layer plated on the outer surface of said copper substrate, in which said copper substrate and said iron layer are integrally shaped under pressure into a desired final tip configuration.

7. The soldering tip as defined in claim 6, wherein the iron outer layer has a Vickers hardness of less than 260 Hv in the plated state.

8. The soldering tip as defined in claim 7, wherein the iron outer layer has a Vickers hardness of less than 200 Hv in the plated state.

* * * * *